(12) United States Patent
Ehbets

(10) Patent No.: US 7,884,941 B2
(45) Date of Patent: Feb. 8, 2011

(54) SPECTRAL MEASURING SYSTEM

(75) Inventor: Peter Ehbets, Zurich (CH)

(73) Assignee: X-Rite Europe GmbH, Regensdorf (CH)

( * ) Notice: Subject to any disclaimer, the term of this patent is extended or adjusted under 35 U.S.C. 154(b) by 175 days.

(21) Appl. No.: 12/203,733

(22) Filed: Sep. 3, 2008

(65) Prior Publication Data

US 2009/0066961 A1    Mar. 12, 2009

(30) Foreign Application Priority Data

Sep. 7, 2007    (EP) .................................. 07115905

(51) Int. Cl.
*G01N 21/55* (2006.01)
(52) U.S. Cl. ..................................... 356/445
(58) Field of Classification Search ................ 356/303, 356/319, 323, 326, 445
See application file for complete search history.

(56) References Cited

U.S. PATENT DOCUMENTS

| | | | |
|---|---|---|---|
| 5,377,047 A | 12/1994 | Broome et al. | |
| 5,461,475 A * | 10/1995 | Lerner et al. | 356/300 |
| 6,252,722 B1 | 6/2001 | Kittaka et al. | |
| 7,057,727 B2 * | 6/2006 | Ott | 356/418 |
| 7,113,281 B2 * | 9/2006 | Ott | 356/418 |
| 7,342,658 B2 * | 3/2008 | Kowarz et al. | 356/328 |
| 7,532,323 B2 * | 5/2009 | Tang et al. | 356/317 |
| 7,633,616 B2 * | 12/2009 | Hing | 356/326 |
| 7,693,324 B2 * | 4/2010 | Brasen et al. | 382/149 |
| 2001/0052977 A1 * | 12/2001 | Toyooka | 356/326 |
| 2007/0009148 A1 * | 1/2007 | Brasen et al. | 382/149 |
| 2007/0132998 A1 * | 6/2007 | Tang et al. | 356/417 |
| 2007/0146700 A1 * | 6/2007 | Kowarz et al. | 356/310 |

OTHER PUBLICATIONS

European Search Report dated Dec. 20, 2007.
Minitarget product literature from Ugra/Fogra (2 pgs.), Copyright 2009.

* cited by examiner

*Primary Examiner*—Roy Punnoose
(74) *Attorney, Agent, or Firm*—McCarter & English, LLP

(57) ABSTRACT

A measuring system for photoelectrically scanning measurement points of a measurement object includes a lighting channel (21-24) for applying illuminating light to the measurement object (M) disposed in a measurement plane (MP) and a measuring channel (11-13) for capturing and photoelectrically converting the measurement light reflected by the measurement points of the measurement object M. The lighting channel and/or the measuring channel is configured so as to detect the reflection properties of the measurement points in several wavelength bands. The lighting channel (21-24) has a spatial light modulator controlled by an electronic control unit (40) for generating a spatial lighting pattern which causes illuminating light to be selectively applied to measurements points (25) of interest of the measurement object (M). The control unit (40) may be equipped with image processing functions and be configured to identify measurement points (25) suitable for the application purpose from image data of the measurement object (M) and to calculate corresponding lighting patterns for selectively illuminating the measurement points.

7 Claims, 1 Drawing Sheet

SPECTRAL MEASURING SYSTEM

FIELD OF THE INVENTION

Figures 1, 2:
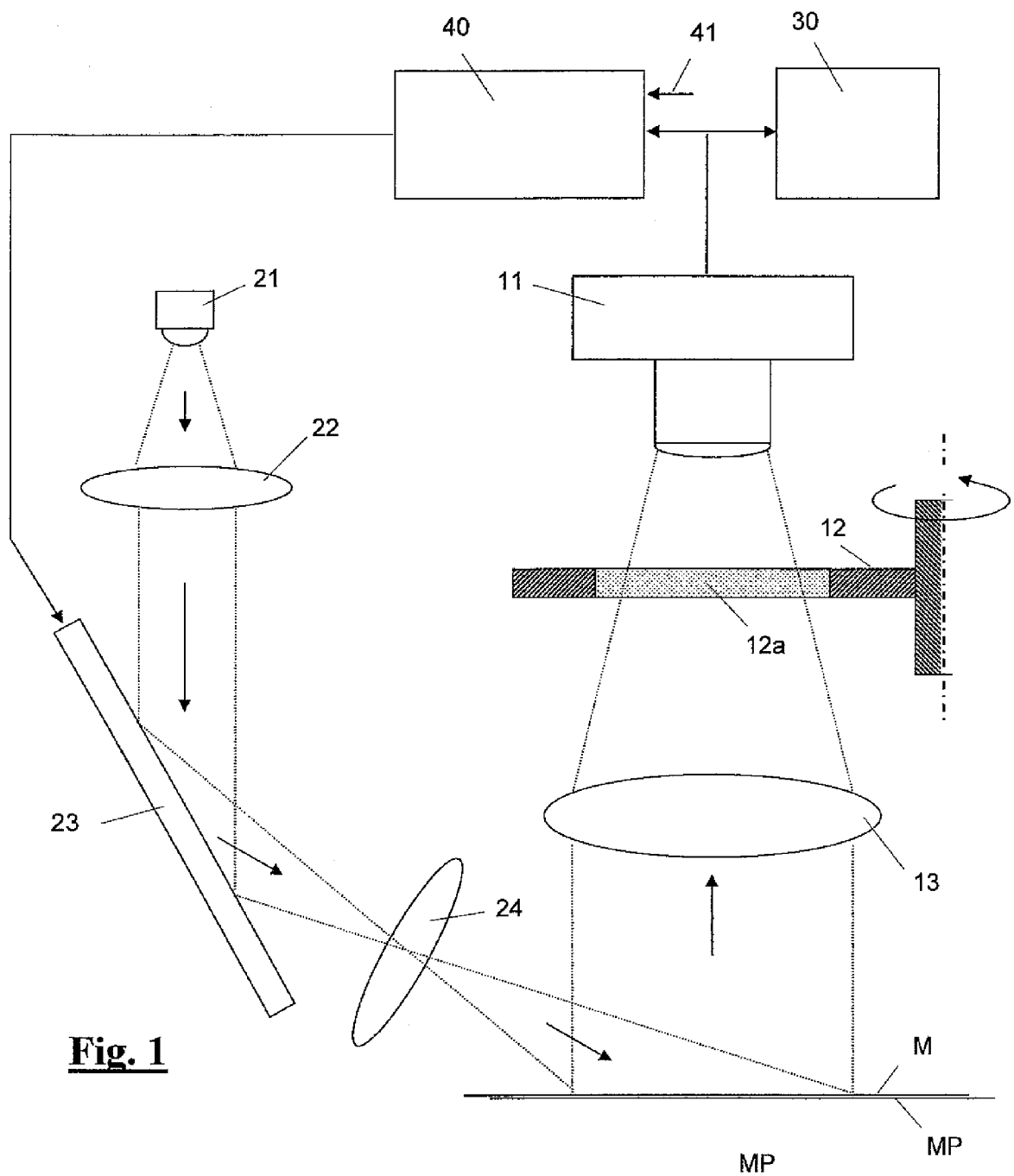

The invention relates to a measuring system for photoelectrically scanning measurement points of a measurement object.

BACKGROUND OF THE INVENTION

Measuring systems of the generic type are typically used for controlling printing processes. In this application, measurements are usually taken of color measuring bars of the various printing inks used for printing. The color measuring bars typically have a side length of a few millimeters and are usually printed alongside the edge of the actual printed image.

These days, standard print control bars used in a standard printing process are measured either with conventional handheld spectral photometers or with scanning measurement systems such as the Intellitrax System made by the X-Rite company or the AxisControl System made by Heidelberger Druckmaschinen, for example. These systems are equipped with a single spectral measuring head. The Intellitrax System also has a track finding system for automatically guiding and positioning the measuring head along the print control bar and synchronizing the measuring rate.

The printed surface occupied by the simultaneously printed color measuring bars leads to paper wastage and there is therefore a definite need to keep this surface as small as possible for reasons of cost.

Using smaller color measuring bars increases measuring requirements from various points of view.

Smaller measuring bars are difficult to measure using handheld devices. Below a certain size, it becomes practically impossible to position the measuring device precisely by hand. For very small color measuring bars, therefore, it is necessary to use an automatic measuring system with electronically assisted positioning technology in order to determine the exact position of the color measuring bar on the measurement object.

The size of the color measuring bar is also limited by the uniformity of the printing process and the scanning frequency used. The measuring technology must be capable of determining a representative mean value, which is independent of local fluctuations in the way the ink is applied or of the relative positioning of the scanning structure. Too small color measuring bars do not enable a mean value to be determined satisfactorily. One way of getting round this problem is to sub-divide the color measuring bar into a plurality of smaller color measuring elements. This enables these color measuring elements to be distributed at points across the entire measurement object where they will not cause interference. Measuring a lot of smaller color measuring elements enables finer measurement values to be obtained (from the same color measuring elements and color measuring elements with the same spectral reflection properties), thereby resulting in more representative measurement values.

Measuring speed or measuring time is also an important factor in a productive printing process. Ideally, it should be possible to measure a lot of these small color measuring elements at the same time (in parallel), for which purpose image detection and image processing techniques are necessary. One problem of image processing technology in connection with relatively small color measuring elements is the considerable amount of optical crosstalk which occurs, caused by the lighting of the image areas adjacent to the color measuring elements. Typical crosstalk values are in the order of 1% or higher, which is not acceptable for process control and quality assessment applications. It is therefore necessary to take steps to eliminate crosstalk.

A measurement field layout with smaller measuring fields was introduced by FOGRA and UGRA under the name of Minitarget. Such a Minitarget comprises 12 color measuring bars which are arranged in a fixed, predefined pattern. However, the overall dimensions of the Minitarget are still 10 mm*13 MM, which means that paper wastage can not be totally avoided. The Techkon company has developed a camera-based density measuring system (MTC920) which is suitable for measuring and analyzing such Minitargets.

Documents EP1213568B1 and EP1213569B1 describe spectral image measuring techniques with digital crosstalk compensation. However, these techniques require complicated characterizations and are only suitable for small measurement objects to a limited degree.

SUMMARY OF THE INVENTION

The objective of this invention is to improve a measuring system of the generic type to make it suitable for taking precise measurements of the spectral reflection properties of very small color measuring elements or measurement points and in particular within a printed image. In particular, optical crosstalk effects should be eliminated or minimized as far as possible.

This objective is achieved by the invention on the basis of the design features specified in the characterizing part of the independent claim. Other improved features and advantageous embodiments of the invention are defined in the dependent claims.

The basic idea of the invention is to equip the measuring system with image-producing capabilities both in the lighting channel and in the actual measuring channel.

The image data of the printed image (measurement object) obtained in the measuring channel is used as basic image data for identifying measurement points of interest in the image (measurement object). This basic image data is then used to control the image-producing system in the lighting channel in order to generate an appropriate lighting pattern with light and dark points in the measurement plane (plane of the measurement object). The lighting pattern is configured so that the measurement points of interest are optically isolated or optical crosstalk of image data from other image points is at least reduced to an acceptable level.

The measurement points of interest are defined by the application used in the measuring system and may comprise small color control elements distributed across the surface of the printed image, for example. Measurement points with similar properties can be isolated and measured in parallel. Measurement points with different properties can be measured sequentially using an appropriately adapted lighting pattern.

Due to the image-producing capabilities in both channels (lighting and measuring channel) and the free programmability (controllability) of the lighting system, the measuring system is not restricted to a fixed format.

The lighting (and masking) pattern may be calculated in various ways. If the image pixel positions of the measurement points of interest within the measurement object or image are known, it is obviously possible to run a direct calculation, i.e. the lighting pattern is set so that only image pixels from the measuring points of interest are illuminated and all other image pixels are not illuminated (masked).

Otherwise, the image data can be analyzed on the basis of its spectral reflection properties and appropriate lighting patterns calculated from these. The analysis may be based on an approach whereby zones with similar low reflection values are identified and only these are then illuminated, which means that zones with different higher reflection values are therefore not illuminated or are masked.

Known methods used for spectral image measurements are based on a series of measurements and the image data for every filter channel or wavelength range is detected sequentially. Specific examples are lighting arrangements with a white light source and monochromator or filter wheel or the use of a filter wheel in the measuring channel. In this case, the mask function is adapted to every image of a filter channel. What is decisive in terms of the segmentation criterion of a first measurement for analyzing image data is the amplitude of the local reflection factor. Zones with similar low reflection factors can be identified in the image on the basis of the amplitude of the measurement values and then measured precisely with a corresponding mask function (lighting pattern) in the lighting system. One specific segmentation criterion which might be used is a local reflection factor of less than 0.1 times the corresponding white level, for example. The second measurement enables spatial crosstalk to be actively reduced and the integration time to be adapted in order to obtain greater modulation of the signal level and reduce noise. Zones with high reflection factors are not critical to crosstalk. These measurement values can be used directly from the first test measurement.

Document US 2007/0132998A1 describes a fluorescence microscope for the observation and electronic image detection of fluorescing biological structures. In order to prevent photo-toxic effects and adapt the image sensors used to the dynamics, the illuminating light exciting the fluorescence can be spatially modulated as a function of intensity. The spatial modulator used and the lighting pattern generated by it are digitally controlled on the basis of the image data generated by the image sensor so that the image sensor operates in its optimum sensitivity range. The lighting pattern can also be manually adjusted so that only areas of the measurement object of interest are illuminated. Although this document shows that the techniques used in the measuring system proposed by the invention are not unknown as such, they are used in a totally different context and for a totally different purpose. The measuring system proposed by the invention can be configured using one-dimensional image-producing scanning systems such as (line) scanners, for example, or also two-dimensional image-producing scanning systems such as digital cameras, etc.

BRIEF DESCRIPTION OF THE INVENTION

An example of an embodiment of the measuring system proposed by the invention equipped with a digital camera, i.e., a two-dimensional image-producing scanning system, will be described in more detail below with reference to the appended drawings. Of the drawings:

FIG. 1 is a schematic diagram of the example of the embodiment of the measuring system proposed by the invention and FIG. 2 shows an example of spatially modulated lighting of the measurement object.

DETAILED DESCRIPTION OF EXEMPLARY EMBODIMENTS

The measuring system has a lighting channel for applying illuminating light to a measurement object M disposed in a measurement plane MP and a measuring channel for capturing and photoelectrically converting the measurement light reflected by the measurement object M.

The geometry of the lighting channel and the measuring channel is configured in accordance with the international standards governing the intended use of the measuring system. A geometry of 45°/0° in accordance with ISO 13655 is typically used for color measuring applications in the graphics industry, as also illustrated in FIG. 1.

The measuring channel comprises a digital camera 11 with a two-dimensional image sensor, a rotating filter wheel 12 with filters 12a of differing spectral transmission curves and a lens system 13, which reproduces the measurement plane MP on the image sensor of the camera 11. It goes without saying that any other technology could be used instead of the filter wheel 12 for obtaining the spectral resolution of the measuring channel.

The lighting channel comprises a white light source 21, an illuminating lens 22, an electrically controllable spatial light modulator 23 and an imaging lens 24. The illuminating lens 22 illuminates the light modulator 23 uniformly. The light modulator 23 causes a spatial modulation of the illuminating light and the imaging lens 24 reproduces the spatial distribution of the illuminating light intensity downstream of the light modulator 23 on the measurement plane MP.

The light modulator 23 comprises a plurality of modulator elements which can be individually activated and can at least be switched on and off so that they allow light to pass through or not to pass through. It is also possible to use a light modulator, the modulator elements of which are capable of producing gray scales. The light modulator can be operated in transmission mode or reflection mode. Suitable spatial light modulators are available on the market. Examples are systems based on liquid crystals (transmission mode) or based on micro-electro-mechanical system (MEMS) technology in modulators based on silicon (reflection mode), special Digital Mirror Devices (DMD sold by Texas Instruments, or LCOS-based modulators (Liquid Crystal on Silicon). In the embodiment illustrated as an example, the light modulator 23 is a DMD-based type operating in reflection mode. This light modulator comprises a matrix of activatable, miniaturized tilting mirrors which can be electrically switched into two modes (on/off).

The measuring system also has a processing unit 30 for preparing, processing and outputting measurement data generated by the camera 11 and a control unit 40 for electronically activating the spatial light modulator 23.

The way in which illuminating image points (modulator elements, tilting mirrors) on the spatial light modulator 23 co-operate with observed image points in the measurement plane MP is stored in the control unit 40. The control unit 40 also has image analyzing capabilities. The latter are used to calculate the illuminating or masking pattern needed for measuring the measurement points of interest. As mentioned above, this is done either based on a knowledge of the positions of the measurement points of interest or by means of appropriate algorithms, which evaluate the spectral reflection properties of the measurement points. The positions of the measurement points of interest or other control parameters may be input to the control unit 40 manually via an input 41 or by means of a higher-ranking application control system.

The control unit 40 generates control signals for the individual modulator elements of the spatial light modulator 23 in order to generate the previously calculated illuminating and masking pattern. To this end, the individual modulator elements of the light modulator 23 are switched on an off as a function of the desired lighting pattern.

The process of measuring the measurement object M is started by detecting the entire image by means of the camera 11 and identifying the measurement points of interest. Only the measurements points of interest in the image are then measured precisely in one or more passes, depending on the nature and number of the measurement points of interest. The illuminating light is spatially modulated accordingly for taking these measurements. From the image data detected and the measurement points identified in the first step, the control unit 40 calculates the requisite number of different lighting patterns and hence the measurement passes to be conducted in sequence.

FIG. 2 illustrates an example of a lighting pattern. The major part of the measurement plane MP remains unilluminated and illuminating light is applied to only a few measurement points 25 that are of interest.

The measuring system proposed by the invention may be configured in many ways.

For example, an RGB camera may be provided in the measuring channel and a light source which can be switched to different wavelength ranges may be provided in the illuminating channel. The switchable light source may be a white light source in combination with a monochromator or a filter wheel or a combination of light-emitting diodes with differing emission wavelengths or any other arrangement which enables illuminating light of differing wavelength ranges to be generated.

A combination of a conventional RGB camera and a single-channel spectrometer may be used in the measuring channel. The single-channel spectrometer enables a spectrum to be measured for the detected measurement range. A typical example is a diffraction spectrometer with an inlet gap and a detector array for detecting the spectral data. It is not possible to run a selective evaluation of image data within the detected measurement range. This function is assumed by the spatially modulable lighting which illuminates only in ranges of the same color during a measurement. The spectral measurement with the single-channel spectrometer then corresponds to a mean value across all spatial ranges.

The RGB image data generated by the camera is used to identify points of measurement with the same color structure. Same color structure in this instance means the same RGB measurement values. Each of these measurement points is then optically isolated by means of a corresponding lighting pattern and spectrally measured by means of the spectrometer.

The measuring system proposed by the invention may be designed as a laboratory measuring device enabling larger printed sheets to be measured.

It may also be incorporated in a handheld measuring device, thereby imparting new properties and measurement options to the handheld measuring device compared with conventional measuring devices of this type, e.g. a variable measurement field size and automatic measurement field identification.

The lighting channel may also be equipped with zoom capabilities, permitting different resolutions and measurement field sizes.

The measuring system proposed by the invention may be used for measuring textiles or differently colored yarns. Due to the fact the illuminating light is spatially modulated, the individual yarns can be optically isolated from the area surrounding them, thereby enabling their reflection spectrum to be measured to a higher degree of precision.

The measuring system proposed by the invention may be used for calorimetric applications in the visible light wavelength range or for other applications in other light wavelength ranges, e.g. near infra red or ultra violet.

The technical principles of the measuring system proposed by the invention are also very suitable for inline and online measuring systems in the printing process. In the context of this application, the spatially modulable lighting may be used to create an appropriate lighting pattern from printed sheet to printed sheet or from image object to image object. The lighting pattern on every printed sheet is selected so that a selected type of a respective print control element or only measurement points with a similar spectral absorption are detected and measured in parallel. The lighting pattern is calculated and optimized as soon as a complete printed image has been detected and stored at the start of the printing process. The other measurements are then taken on a sequential basis only, with lighting patterns adapted accordingly in order to suppress crosstalk. For the actual measurements, a sufficiently fast two-dimensional digital camera may be used (as is the case in the embodiment illustrated as an example in FIG. 1) or alternatively a one-dimensional line camera, in which case the lighting pattern is generated along the respective scanning lines and as a function of the respective position of the scanning lines.

A measuring system for photoelectrically scanning measurement points of a measurement object comprises a lighting channel (21-24) for applying illuminating light to the measurement object (M) disposed in a measurement plane (MP) and a measuring channel (11-13) for capturing and photoelectrically converting the measurement light reflected by the measurement points of the measurement object M. The lighting channel and/or the measuring channel is configured so as to detect the reflection properties of the measurement points in several wavelength bands. The lighting channel (21-24) has a spatial light modulator controlled by an electronic control unit (40) for generating a spatial lighting pattern which causes illuminating light to be selectively applied to measurements points (25) of interest of the measurement object (M). The control unit (40) is equipped with image processing functions and is configured to identify measurement points (25) suitable for the application purpose from image data of the measurement object (M) and calculate corresponding lighting patterns for selectively illuminating the measurement points. Alternatively, the control unit (40) can also calculate lighting patterns on the basis of position data of measurement points (25) of interest and activate the spatial light modulator (23) to generate the calculated lighting patterns. The measuring channel has an image-producing scanning device (11) for the measurement object (M), which scanning device generates image data of the measurement object and forwards it to the control unit (40) to calculate lighting patterns.

The lighting patterns spatially modulated as a function of intensity enable the measurement points of interest to be optically isolated, thereby eliminating optical crosstalk effects. The measuring system is therefore suitable for taking precise spectral measurements of very small measurement points distributed within the measurement object.

Although the present invention has been described with reference to exemplary embodiments, the scope of the present invention is not limited by or to such exemplary embodiments. Rather, the present invention may be subjected to modifications, variations and/or enhancements without departing from the spirit or scope hereof.

The invention claimed is:

1. Measuring system for photoelectrically scanning measurement points of a measurement object being a printed image, comprising a lighting channel for applying illuminating light to the measurement object disposed in a measurement plane and a measuring channel for capturing and photoelectrically converting the measurement light reflected by the measurement points of the measurement object;

wherein at least one of the lighting channel and the measuring channel is configured so as to detect the reflection properties of the measurement points in several wavelength bands;

wherein the lighting channel has a spatial light modulator controlled by an electronic control unit in order to generate a spatial lighting pattern which causes illuminating light to be selectively applied to measurement points of the measurement object that are of interest;

wherein the process of measuring the measurement object starts by detecting the entire image by means of an image-producing scanning device being a camera;

wherein the control unit is configured to identify measurement points appropriate for the application from image data of the measurement object for the application purpose and calculate corresponding lighting patterns for selectively illuminating the measurement points, wherein the image data are detected by the image-producing scanning device;

wherein the measuring channel has the image-producing scanning device for the measurement object, which scanning device generates image data of the measurement object and forwards it to the control unit for calculating lighting patterns;

wherein the control unit is configured to calculate a number of different lighting patterns by analyzing the image data on the basis of reflection properties, wherein zones with similar reflection values are identified in order to calculate a lighting pattern;

wherein the control unit is further configured to calculate the number of different lighting patterns and the number of measurement passes which are thus to be sequentially conducted on the basis of the image data and the identified measurement points;

wherein the control unit is further configured to sequentially conduct the measurement passes with the calculated different lighting patterns.

2. The measuring system according to claim 1, wherein the control unit is equipped with image processing functions.

3. The measuring system according to claim 2, wherein the control unit is configured to calculate lighting patterns on the basis of position data pertaining to the measurement points of interest and activate the spatial light modulator to generate the calculated lighting patterns.

4. The measuring system according to claim 1, wherein the control unit identifies the measurement points from the image data of the measurement object on the basis of predefined spectral reflection properties.

5. The measuring system according to claim 1, wherein the image-producing scanning device is a one-dimensional or two-dimensional image converter, in particular a digital camera.

6. The measuring system according to claim 1, wherein, in addition to the image-producing scanning device, the measuring channel also has a spectral measuring head for measuring the measurement points of interest.

7. The measuring system according to claim 1, wherein the spectral resolution is obtained by means of a light source in the lighting channel which can be switched to different wavelength ranges.

* * * * *